(12) United States Patent
Donderici

(10) Patent No.: US 10,233,742 B2
(45) Date of Patent: Mar. 19, 2019

(54) DOWNHOLE ACOUSTIC RANGING UTILIZING GRADIOMETRIC DATA

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 339 days.

(21) Appl. No.: 14/914,533

(22) PCT Filed: Oct. 31, 2013

(86) PCT No.: PCT/US2013/067836
§ 371 (c)(1),
(2) Date: Feb. 25, 2016

(87) PCT Pub. No.: WO2015/065447
PCT Pub. Date: May 7, 2015

(65) Prior Publication Data
US 2016/0201450 A1    Jul. 14, 2016

(51) Int. Cl.
| | | |
|---|---|---|
| *E21B 7/00* | (2006.01) | |
| *G01V 1/00* | (2006.01) | |
| *E21B 47/022* | (2012.01) | |
| *E21B 43/24* | (2006.01) | |
| *E21B 7/04* | (2006.01) | |
| *G01V 1/42* | (2006.01) | |

(52) U.S. Cl.
CPC ........ *E21B 47/02208* (2013.01); *E21B 7/046* (2013.01); *E21B 43/2406* (2013.01); *G01V 1/42* (2013.01)

(58) Field of Classification Search
USPC .......................................................... 367/118
See application file for complete search history.

(56) References Cited

U.S. PATENT DOCUMENTS

| | | |
|---|---|---|
| 4,198,705 A | 4/1980 | Massa |
| 4,845,434 A | 7/1989 | Kuckes et al. |
| | (Continued) | |

FOREIGN PATENT DOCUMENTS

| | | |
|---|---|---|
| EP | 1666698 A1 | 6/2006 |
| EP | 1815101 A1 | 8/2007 |
| | (Continued) | |

OTHER PUBLICATIONS

Office Action issued for RU 2016107736 dated Mar. 13, 2017, 17 pages with translation.

(Continued)

*Primary Examiner* — James R Hulka
(74) *Attorney, Agent, or Firm* — Haynes and Boone, LLP

(57) ABSTRACT

An acoustic ranging system utilizes gradiometric data to determine the distance between a first and second well without any knowledge or involvement of the borehole or formation characteristics. An acoustic signal is generated from a downhole or surface source, propagated along a first well, and then received by receivers positioned along the second well. Processing circuitry coupled to the receivers takes a ratio of the absolute signal to the gradient signal in a certain direction to thereby determine the relative position and distance between the two wells.

19 Claims, 4 Drawing Sheets

(56) References Cited

U.S. PATENT DOCUMENTS

| | | | |
|---|---|---|---|
| 4,933,640 A | 6/1990 | Kuckes | |
| 6,069,961 A | 5/2000 | Nakazawa | |
| 7,283,422 B2 | 10/2007 | Shook et al. | |
| 7,568,532 B2 | 8/2009 | Kuckes et al. | |
| 7,916,578 B2* | 3/2011 | Minto | G01V 1/143 |
| | | | 181/104 |
| 2005/0117452 A1* | 6/2005 | Calvert | G01V 1/42 |
| | | | 367/73 |
| 2005/0167101 A1 | 8/2005 | Sugiyama | |
| 2006/0227661 A1* | 10/2006 | Shook | G01V 1/306 |
| | | | 367/47 |
| 2007/0064532 A1* | 3/2007 | Haldorsen | G01V 1/37 |
| | | | 367/57 |
| 2007/0176842 A1* | 8/2007 | Brune | H01Q 1/04 |
| | | | 343/866 |
| 2007/0278008 A1* | 12/2007 | Kuckes | E21B 47/02216 |
| | | | 175/40 |
| 2008/0224887 A1* | 9/2008 | Varsamis | G01V 11/002 |
| | | | 340/853.9 |
| 2009/0194333 A1 | 8/2009 | MacDonald | |
| 2009/0296522 A1* | 12/2009 | Tang | E21B 47/02208 |
| | | | 367/28 |
| 2010/0305863 A1* | 12/2010 | Abubakar | G01V 3/38 |
| | | | 702/7 |
| 2011/0051552 A1* | 3/2011 | Pistre | G01V 1/50 |
| | | | 367/33 |
| 2011/0079461 A1* | 4/2011 | Allen | G01V 1/003 |
| | | | 181/106 |
| 2011/0249531 A1* | 10/2011 | Gulati | G01V 1/282 |
| | | | 367/73 |
| 2012/0051184 A1 | 3/2012 | McElhinney | |
| 2012/0307592 A1* | 12/2012 | Pistre | G01V 1/50 |
| | | | 367/27 |
| 2013/0087325 A1* | 4/2013 | Bartko | E21B 41/0035 |
| | | | 166/250.1 |
| 2013/0341092 A1* | 12/2013 | Hay | E21B 7/04 |
| | | | 175/24 |
| 2014/0123748 A1* | 5/2014 | Airey | G01V 1/42 |
| | | | 73/152.58 |
| 2017/0160422 A1* | 6/2017 | Donderici | G01V 3/28 |
| 2017/0261631 A1* | 9/2017 | Donderici | G01V 3/38 |

FOREIGN PATENT DOCUMENTS

| | | |
|---|---|---|
| RU | 2 362 189 C2 | 8/2008 |
| WO | WO 2009/146548 A1 | 12/2009 |
| WO | WO 2012/027105 A1 | 3/2012 |
| WO | WO 2012/067611 A1 | 5/2012 |

OTHER PUBLICATIONS

International Preliminary Report on Patentability, dated Apr. 10, 2015, PCT/US2013/067836, 7 pages, IPEA/US.

International Search Report, dated Mar. 24, 2014, PCT/US2013/067836, 1 page, ISA/US.

Examination Report issued for IN Patent Application No. 201617006914 dated May 30, 2018, 6 pages.

* cited by examiner

DOWNHOLE ACOUSTIC RANGING UTILIZING GRADIOMETRIC DATA

The present application is a U.S. National Stage patent application of International Patent Application No. PCT/US2013/067836, filed on Oct. 31, 2013, the benefit of which is claimed and the disclosure of which is incorporated herein by reference in its entirety.

FIELD OF THE DISCLOSURE

The present disclosure relates generally to acoustic ranging and, more specifically, to an acoustic ranging method utilizing gradiometric data to determine and track the location of multiple wellbores relative to one another.

BACKGROUND

As the easy-to-access and easy-to-produce hydrocarbon resources depleted over the last century, more and more difficult wells remain. Moreover, as the world's hydrocarbon demand is continuously growing, meeting this demand requires development of more advanced recovery procedures. One such procedure is Steam Assisted Gravity Drainage ("SAGD"), a procedure that utilizes steam in conjunction with two spaced apart wellbores. Specifically, SAGD addresses the mobility problem of heavy oil in a formation through the injection of high pressure, high temperature steam into the formation. This high pressure, high temperature steam reduces the viscosity of the heavy oil in order to enhance extraction. The injection of steam into the formation occurs from an injector wellbore that is drilled above and parallel to another producer wellbore.

As the viscosity of the heavy oil in the formation around the injector wellbore is reduced, the heavy oil drains into the lower producer wellbore, from which the oil is extracted. Preferably, the two wellbores are drilled at a distance of only a few meters from one other. The placement of the injector wellbore needs to be achieved with very small margin in distance.

Therefore, such downhole procedures present some challenges. If the injector wellbore is positioned too close to the producer wellbore, the producing well would be exposed to very high pressure and temperature. If the injector wellbore is positioned too far from the producer wellbore, the efficiency of the SAGD process is reduced. It is well known that traditional magnetic and gravity-based surveying techniques suffer from a widening cone of uncertainty as the wells become longer, making it more difficult to achieve the precision in placement that is required in SAGD applications.

Existing acoustic ranging methods depend on time of flight calculations that assume a velocity profile that may not be accurate due to measurement errors, changes in the well path, and horizontal variations in acoustic properties of formations. Such measurements are further complicated by the effect of boreholes on the time of flight calculation, which adds uncertainty to the time of flight estimation.

Accordingly, there is a need in the art for an improved downhole acoustic ranging techniques.

DESCRIPTION OF ILLUSTRATIVE EMBODIMENTS

Illustrative embodiments and related methodologies of the present disclosure are described below as they might be employed in an acoustic ranging method utilizing gradiometric data to drill and track the relative location of wellbores. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments and methodologies of the present disclosure describe acoustic ranging systems that utilize gradiometric data to determine the distance between a first and second well without any knowledge or involvement of the borehole or formation characteristics. In general, this may be achieved by generating acoustic wellbore waves from a downhole or surface source, receiving those waves using a plurality of receivers positioned along the second well, and taking a ratio of the absolute signal to the gradient signal in a certain direction to thereby determine the distance between the two wells. Through use of this normalization technique, embodiments of the present disclosure calculate the distance to a well without any data related to the characteristics of the medium between the wells. The methods described herein may be utilized at acoustic wave frequencies lower than traditional sonic applications, or may be utilized with surface sources that produce acoustic waves on the wellhead that propagate along the well pipe.

Although the present disclosure may be utilized in a variety of applications, the following description will focus on applications for accurately, and reliably positioning a well being drilled, the "injector" well (i.e., second well), with respect to a nearby target first well, usually the producer well, so that the injector well can be maintained approximately parallel to the producer well. Also, the method and system of the disclosure are particularly desirable for the drilling of SAGD wells because the two wells can be drilled close to one another as is required in SAGD operations.

These and other applications and/or adaptations will be understood by those ordinarily skilled in the art having the benefit of this disclosure.

Figure 1:
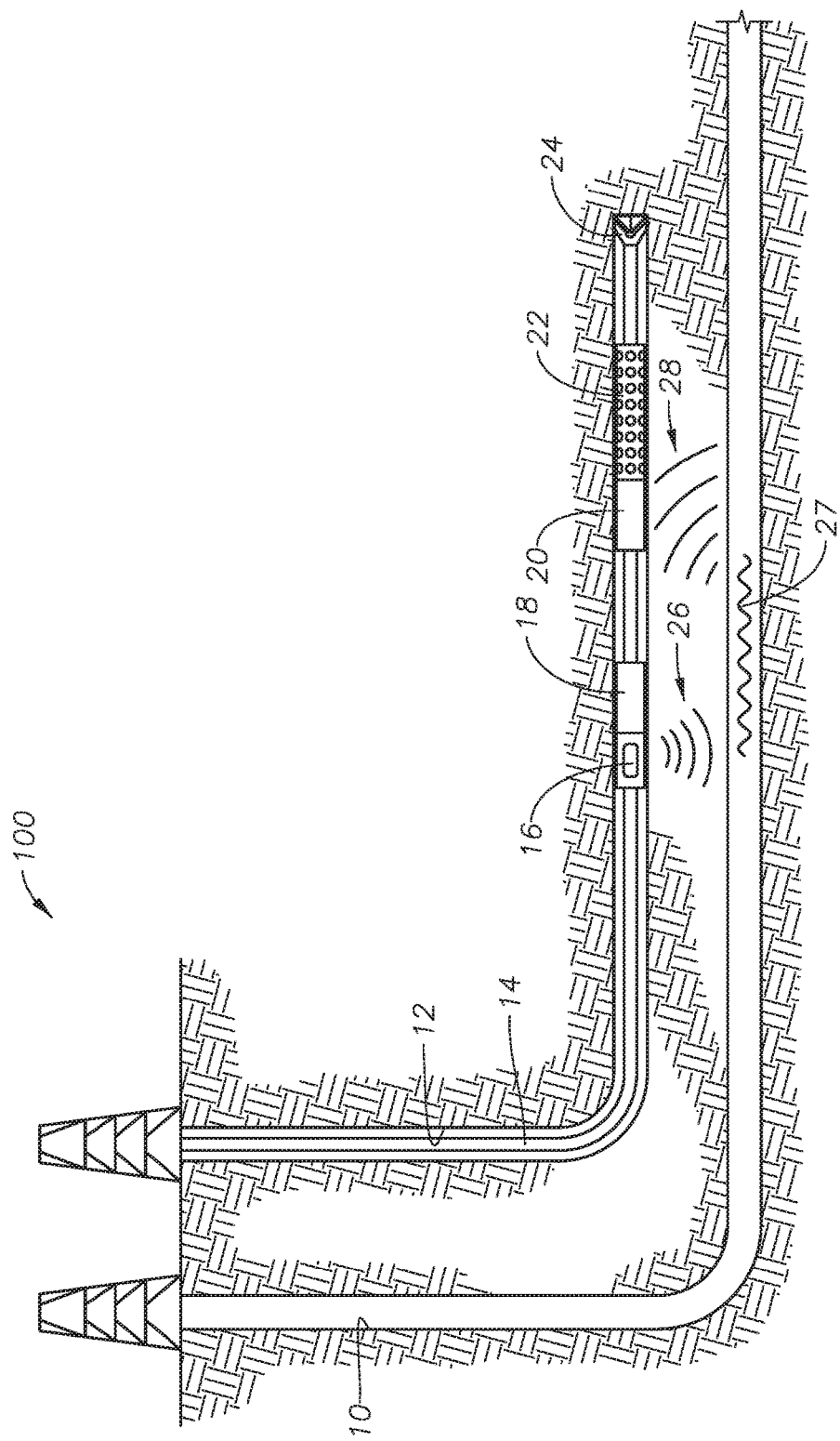
FIGS. 1 and 2 illustrate alternative embodiments of a relative positioning system according to certain illustrative embodiments of the present disclosure.

FIG. 1 illustrates a relative positioning system 100 utilizing a downhole source transmitter according to an illustrative embodiment of the present disclosure. In this embodiment, a producer well 10 is drilled using any suitable drilling technique. Thereafter, producer well 10 may be cased; however, in certain embodiments, producer well 10 may be uncased. Nevertheless, an injector well 12 is then drilled using drilling assembly 14 which may be, for example, a logging-while drilling ("LWD") assembly, measurement-while drilling assembly ("MWD") or other desired drilling assembly. Although injector well 12 is described as being subsequently drilled, in other embodiments producer well 10 and injector well 12 may be drilled simultaneously.

In this illustrative embodiment, drilling assembly 14 includes a bottom hole assembly having an acoustic transmitter 16 positioned adjacent a first isolator 18 which may be, for example, a mass-spring based or slotted isolator. Acoustic transmitter 16 generates low frequency acoustic waves in the range of 0.1 Hz to 100 kHz. Transmitter 16 may take various forms, such as, for example, piezoelectric, shaker or impact-type acoustic generators. In other embodiments, however, other acoustic tools such as, for example, borehole sonic tools with special low frequency excitations may be utilized, provided that enough power can be generated.

Adjacent the lower end of the bottom hole assembly is a second isolator 20 positioned adjacent acoustic receivers 22. Acoustic receivers 22 are those utilized to sense pressure, and may be a piston, geophone, hydrophone or an accelerometer, as will be understood by those ordinarily skilled in the art having the benefit of this disclosure. In certain embodiments, two or more acoustic receivers 22 are positioned radially around the body of the bottom hole assembly in order to thereby provide the direction and distance data determined using the present disclosure, as will be discussed in more detail below. First and second isolators 18,20 prevent acoustic signals from propagating directly from acoustic transmitter 16, through the drilling assembly body, to acoustic receivers 22. A drill bit 24 is positioned at the distal end of the bottom hole assembly to perform drilling operations.

As will be described in greater detail below, during an illustrative drilling operation using relative positioning system 100, drilling assembly 14 is deployed downhole to drill injector well 12 after, or contemporaneously with, the drilling of producer well 10. Still referring to FIG. 1, in order to maintain injector well 12 at the desired distance and direction from producer well 10, relative positioning system 100 activates acoustic transmitter 16 to thereby emit acoustic waves 26 toward producer well 10. In response, waves 26 propagate along the casing (not shown) or open-hole walls of producer well 10 (as indicated by propagation waves 27) and eventually reflect back toward acoustic receivers 22 as acoustic waves 28. Thereafter, circuitry (not shown) at least partially resident within drilling assembly 14 analyzes the received acoustic signals by taking a ratio of the absolute signal to the gradient signal in a certain direction to thereby determine the distance between producer and injector wells 10,12. Once the distance is determined, the circuitry generates signals necessary to steer the drilling assembly 14 in the direction needed to maintain the desired distance and direction from producer well 10.

As mentioned, drilling assembly 14 includes circuitry, along with necessary processing/storage/communication circuitry, to perform the calculations described herein. That circuitry is communicably coupled to one or more acoustic transmitters 16 utilized to generate acoustic waves 26, and also likewise coupled to acoustic receivers 22 in order to process the reflected acoustic waves 28. Additionally, the circuitry included with or in drilling assembly 14 may be communicably coupled via wired or wireless connections to the surface to thereby communicate data back uphole and/or to other assembly components (to steer drill bit 24, for example). In an alternate embodiment, the circuitry necessary to perform one or more aspects of the techniques described herein may be at least partially located at a remote location away from drilling assembly 14, such as the surface or in a different wellbore. For example, in certain embodiments, the acoustic transmitter may be located in another well. These and other variations will be readily apparent to those ordinarily skilled in the art having the benefit of this disclosure.

Although not shown in FIG. 1, the circuitry includes at least one processor and a non-transitory and computer-readable storage, all interconnected via a system bus. Software instructions executable by the processor for implementing the illustrative relative positioning methodologies described herein in may be stored in local storage or some other computer-readable medium. It will also be recognized that the positioning software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 2:
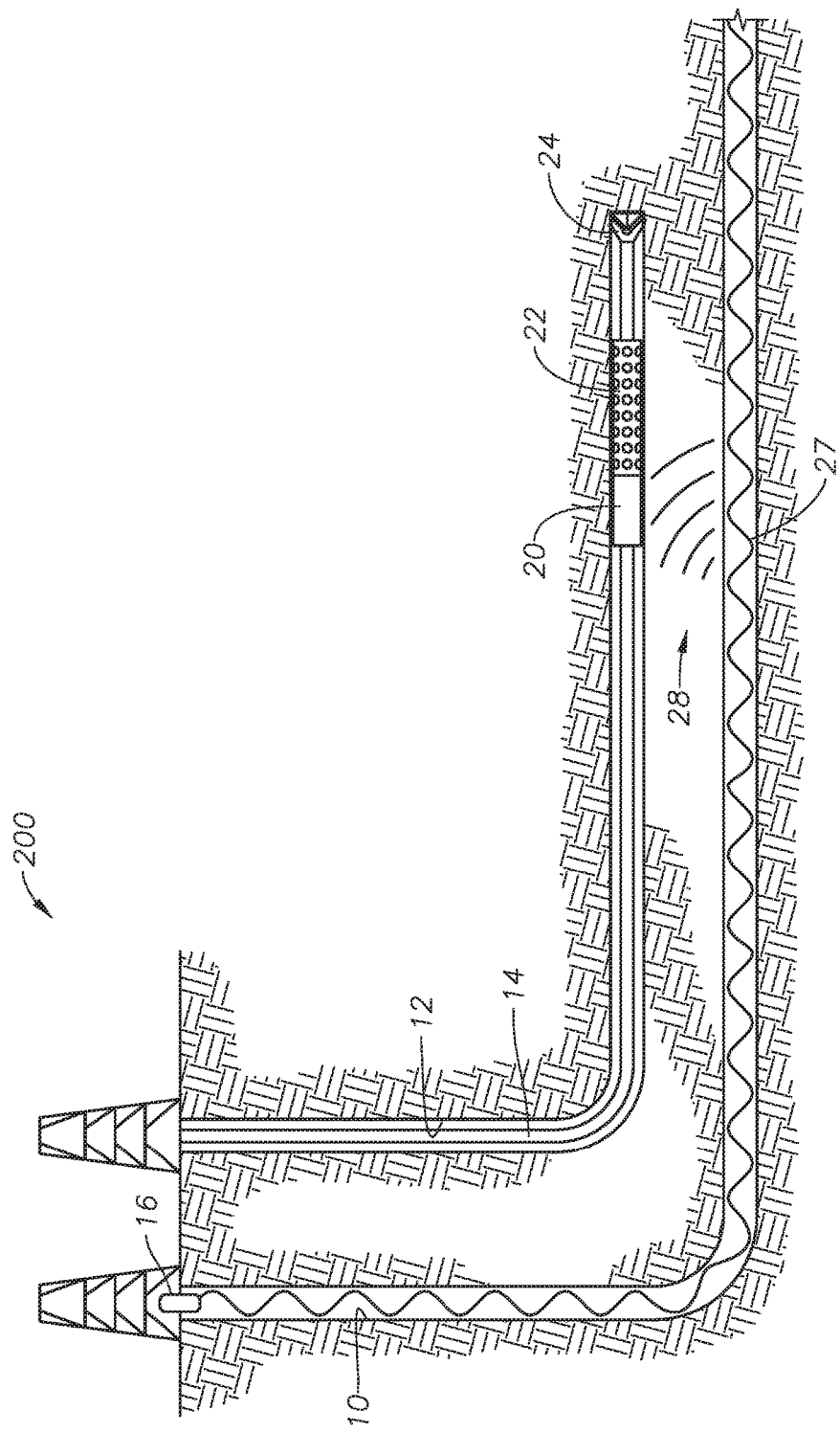

FIG. 2 illustrates a relative positioning system 200 according to certain illustrative embodiments of the present disclosure. Relative positioning system 200 is somewhat similar to relative positioning system 100 described with reference to FIG. 1 and, therefore, may be best understood with reference thereto, where like numerals indicate like elements. In contrast, however, drilling assembly 14 does not include an acoustic transmitter and its adjacent isolator. Instead, an acoustic transmitter 16 is operationally coupled to producer well 10, positioned at a surface location. As previously described, acoustic transmitter 16 may be, for example, a low frequency generating piezoelectric, shaker or impact type acoustic source. Alternatively, however, the acoustic transmitter of system 200 may also be operational noise such as, for example, noise generated by drilling or production equipment along producer well 10, or by the movement of production fluid up producer well 10. In this embodiment, isolator 20 is utilized to block or attenuate acoustic signals that leak out from well 10 to well 12.

During operation of relative positioning system 200, injector well 12 is drill subsequent to, or contemporaneously with, producer well 10. In order to steer drilling assembly 14 as desired, acoustic transmitter 16 is excited to propagate waves 27 down along the casing and/or open hole walls of producer well 10. Ultimately, acoustic waves 28 are emitted toward acoustic receivers 22, whereby on-board/remote circuitry performs the calculations summarized above to thereby steer drilling assembly 14 as desired.

Now that various embodiments have been described, the methodology by which the well distances are determined will now be described. As previously described, relative positioning systems 100,200 consist of two main components: (i) a surface or downhole source transmitter that generates acoustic waves; and (ii) downhole receivers that sense the absolute and/or gradient acoustic signals generated by the source transmitters. In one embodiment, distance and direction from the source pipe (e.g., producer well 10) to receivers 22 can be calculated from the ratio of measured absolute signal to gradient signal.

In certain other embodiments, it is noted here that the role of the transmitter and receivers can be changed without any difference in system operation based on reciprocity theorem, as will be understood by those ordinarily skilled in the art having the benefit of this disclosure. However, the following illustrative methodology will be based on the relative positioning system 200 in which a surface transmitter is utilized. The intention, however, is to cover both surface and wellbore transmitter applications, as will also be understood by those ordinarily skilled in the art having the benefit of this disclosure.

In both the surface and downhole excitation cases (i.e. systems 100,200), borehole propagation waves 27 are generated in producer well 10, which can be compressional, Stoneley, Flexural, or any other type of wave that creates head waves that radiate out. At sufficiently low frequencies, a line source approximation can be made with the pressure outside the borehole written as follows:

$$p(r,t) = j\rho c \frac{Qk}{4\pi r} e^{j(\omega t - kr)}, \quad \text{Eq. (1)}$$

where p(r,t) is pressure at a distance r and at time, p is density of the material, c is the speed of sound in air, ω is frequency, t is time, k is the wave number, r is the distance from center of the source well center, and Q is the source strength. It can be seen from Eq.(1) that the outward pressure decreases with 1/r type behavior as long as the frequency (hence the wave number k) is low enough.

Taking the derivative of Eq.(1) with respect to distance, the following can be obtained:

$$\frac{\partial p(r,t)}{\partial r} = j\rho c \frac{Qk}{4\pi r} e^{j(\omega t - kr)} \left(-\frac{1}{r} - jk\right). \quad \text{Eq. (2)}$$

As can be seen from Eq.(2), the derivative of pressure involves very similar terms compared to the absolute pressure with the exception of a term involving distance and wavenumber. Taking the ratio of absolute and derivative terms, we obtain:

$$-\frac{p(r,t)}{\frac{\partial p(r,t)}{\partial r}} = \frac{1}{\frac{1}{r} + jk} = \frac{r}{1 + jkr} \quad \text{Eq. (3)}$$

-continued
$$\approx r, \text{ if } k << \frac{1}{r}.$$

As it is shown in Eq.(3), the ratio of absolute signal to derivative (or gradient) signal is equal to r as long as the frequency (or wave number) is low enough and there are no high contrast layers in between the wells. Due to cancellation of material property terms, which are density and velocity, this calculation is not affected by the property of the materials. Eq.(3) also does not depend on information on any other variable.

Figure 3:
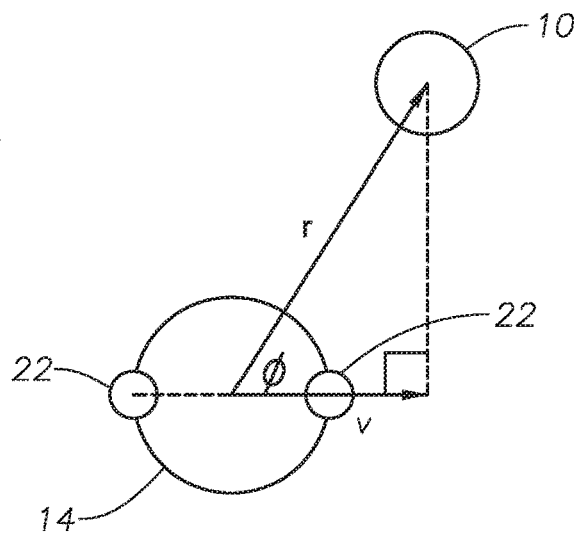
FIG. 3 is a cross-sectional perspective view looking down a producer and injector well from the surface, according certain illustrative embodiments of the present disclosure.

Although Eq.(3) can be used in theory to calculate the distance, it requires the knowledge of the direction to the target well, and also the derivative, both of which may not be readily available. Therefore, in certain illustrative embodiments of the present disclosure, the gradient based relative positioning systems described herein utilize a two receiver system as shown in FIG. 3. FIG. 3 is a cross-sectional perspective view as if looking down producer and injector wells 10,12 from the surface. Note that only assembly 14 is shown (not injector well 12) for simplicity; however, assembly 14 is still positioned along well 12, as previously described. In this example, receivers 22 are radially spaced around the body of drilling assembly 14 and separated along v direction, where v vector is defined as the projection of the r direction onto the line that connects the two receivers, where r vector is the vector that connects the center of the drilling assembly body to the target well (e.g., producer well 10). Based on this illustrative system, the derivative of pressure in v direction is given as:

$$\frac{\partial p(r,t)}{\partial v} = j\rho c \frac{Qk}{4\pi r} e^{j(\omega t - kr)} \left(-\frac{1}{r} - jk\right) \cos(\phi), \quad \text{Eq. (4)}$$

where φ is the angle between the direction of r vector and v vector, which indicates the direction to the target well 10.

Figure 4A:
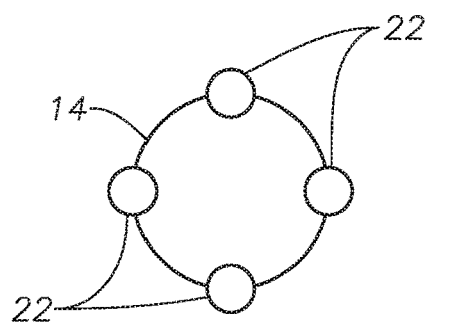
FIGS. 4A, 4B and 4C are cross-sectional views of alternative receiver configurations utilized in a bottom hole assembly of a relative positioning system, according to certain illustrative embodiments of the present disclosure.
Figure 4B:
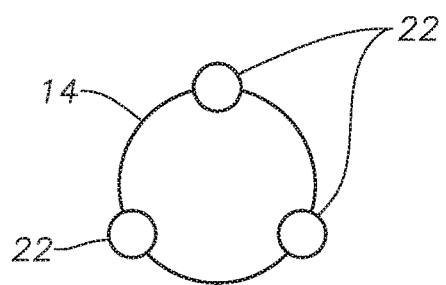
Figure 4C:
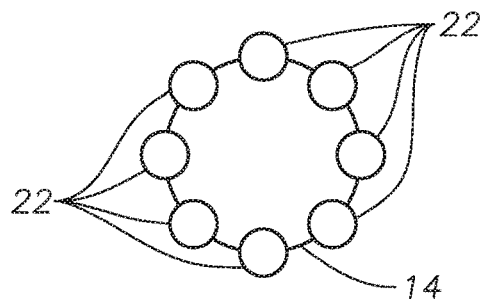

FIGS. 4A-C are cross-sectional views of alternate receiver configurations utilized in a bottom hole assembly of a relative positioning system, according to certain illustrative embodiments of the present disclosure. Considering the four receiver configuration of FIG. 4A, and assuming that the horizontal direction is the x-axis and the vertical axis is y-axis, the direction to the target well 10 can be calculated using:

$$\frac{\frac{\partial p(r,t)}{\partial y}}{\frac{\partial (r,t)}{\partial x}} = \tan(\phi) \quad \text{Eq. (5)}$$

$$\phi = \tan^{-1}\left(\frac{\frac{\partial p(r,t)}{\partial y}}{\frac{\partial (r,t)}{\partial x}}\right).$$

Here, the x- and y-derivatives can be calculated from the difference in receiver measurements divided by the known equivalent distance between the receivers 22. The absolute pressure p(r,t) can be obtained by averaging all of the receiver signals, or by picking one signal. The distance then can be calculated from:

$$\frac{p(r,t)}{\frac{\partial p(r,t)}{\partial x}} = \frac{1}{\cos(\phi)r} \qquad \text{Eq. (6)}$$

$$r = \frac{p(r,t)}{\frac{\partial p(r,t)}{\partial x}} \frac{1}{\cos(\phi)}$$

$$= \frac{p(r,t)}{\frac{\partial p(r,t)}{\partial y}} \frac{1}{\sin(\phi)},$$

where either the x or y formula in Eq.(6) is used based on whichever one has the largest derivative term. For the general case, three receiver configuration in FIG. 4B, or the eight receiver configuration in FIG. 4C, a similar solution can be applied, but with the appropriate definitions of angle. By utilizing a solution of system of equations based on Eq.(4), distance may be obtained simultaneously with direction. This is mathematically the same solution. The eight receiver configuration in FIG. 4C can give extra information which can be used either for quality control or for making a more accurate calculation of the direction. The quality control can be achieved by separating the calculation into two four-receiver calculations and comparing the direction obtained from both. More accurate calculation can be obtained by doing a least squares or another type of fitting of Eq.(4) by utilizing all available receivers.

Figure 5:
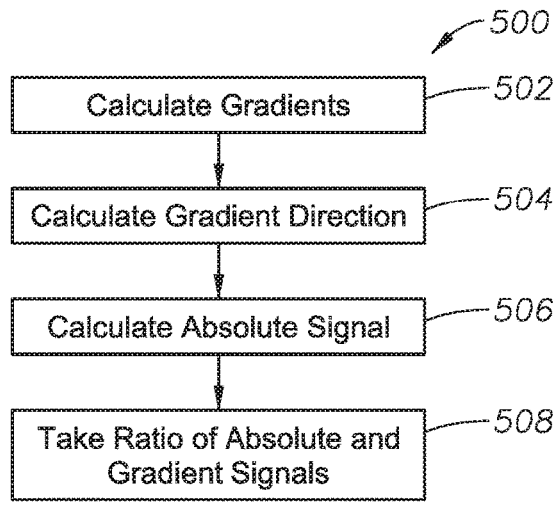
FIG. 5 is a flow chart of a method utilized by a relative positioning system to calculate distance, according certain illustrative methodologies of the present disclosure.

In view of the foregoing, FIG. 5 is a flow chart of a method 500 utilized to calculate distance and relative distance between wells according to certain illustrative methodologies of the present disclosure. Note that this methodology may be utilized in a variety of applications, including, for example, SAGD, logging, wireline or other downhole applications. Nevertheless, the following illustrative method will focus on a SAGD application as shown in FIGS. 1 AND 2. Referring to FIG. 5, after acoustic waves 28 have been detected by receiver 22, using Equations 1-6 described above, relative positioning system 100,200 calculates the corresponding gradients at block 502. At block 504, relative positioning system 100,200 calculates the gradient direction of the detected acoustic waves 28. At block 506, relative positioning system 100,200 calculates the absolute signal of acoustic waves 28. Thereafter, at block 508, relative positioning system 100,200 calculates the distance to the target using the ratio of the absolute and gradient signals.

Figure 6:
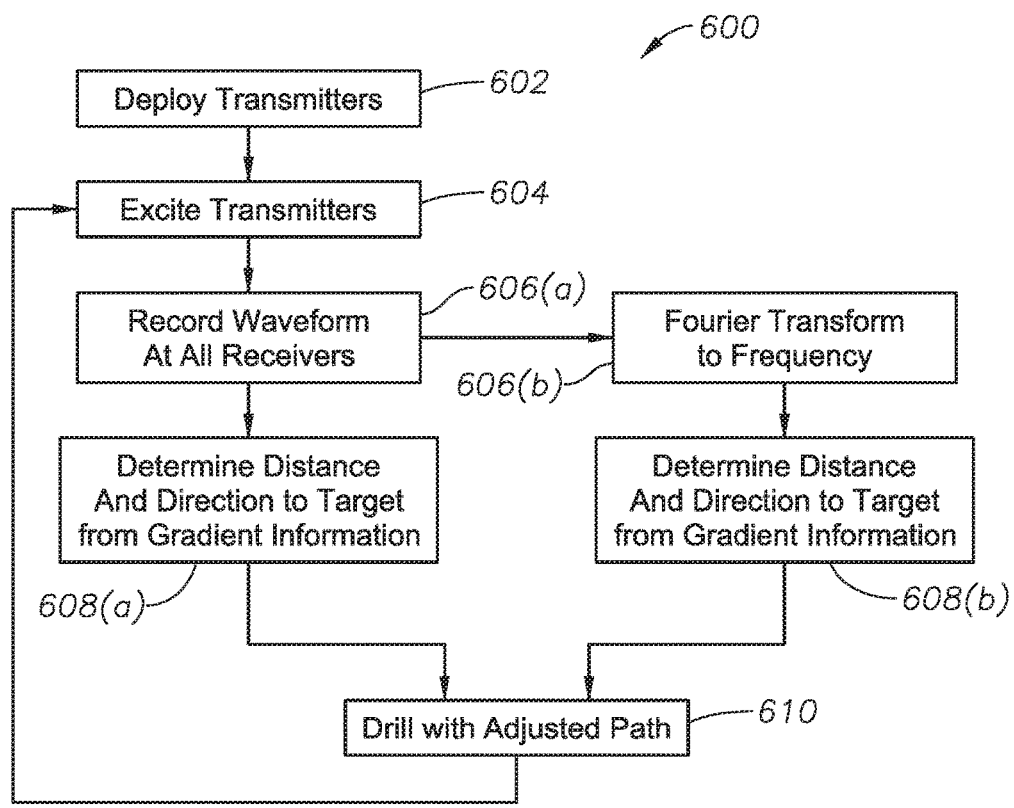
FIG. 6 is a flow chart of an acoustic ranging method employed by a relative positioning system to determine the distance between a first (i.e., target) and second wellbore, according to certain illustrative methodologies of the present disclosure.

FIG. 6 is a flow chart of an acoustic ranging method 600 employed by a relative positioning system that utilizes gradiometric data to determine the distance between a first (i.e., target) and second wellbore, according to certain illustrative methodologies of the present disclosure. Again, the specific application may be, for example, a SAGD or logging application. Nevertheless, at block 602, one or more acoustic transmitters are deployed. As previously mentioned, this deployment could be positioning the transmitters at a surface location whereby the transmitter is operably connected to a first wellbore. Alternatively, the transmitter may be deployed downhole in a second wellbore using, for example, a drilling assembly. In yet another method, the transmitter could be deployed along a third wellbore which subsequently propagates the acoustic waves toward the target wellbore. In other methods, the transmitter could be replaced and, instead, operational noise (caused by production fluid, downhole equipment, etc.) could be utilized to induce acoustic waves along the first wellbore. The surface source, or transmitter, can be a powerful source due to less space restrictions compared to downhole, and it can be in direct contact with the well head for maximum delivery of acoustic energy. In certain embodiments, the source operates at low frequencies between 0.1 Hz and 100 kHz and it can be impact type.

Nevertheless, after the transmitter is deployed, the transmitter is excited to produce an acoustic wave which is propagated along the first well which is ultimately emitted from the first wellbore to the second wellbore. Here, due to excitation of the transmitters, acoustic energy is delivered to the borehole which flows down the first wellbore. In certain embodiments, the transmitters can be in multi-polar configuration and they can be used with monopole or dipole excitation. A short pulse, or a longer transient narrowband signal can be utilized as the excitation function.

At block 606(a), one or more acoustic receivers positioned along the second wellbore sense and record the acoustic waveforms. In an illustrative embodiment, the pressure signals at the receivers are recorded as a function of time, starting at either the time of excitation, continuously, or when a large enough signal is received at the receiver. The recording can be stopped and/or the processing algorithm is initiated at a pre-determined time or when a signal level condition is reached. The processing may consist of steps including filtering for noise and/or time windowing to thereby determine a particular wave type of interest. Note here that in some embodiments, a single receiver may be utilized; although a preferred embodiment utilizes three or more receivers. The receivers may be deployed in the second wellbore in a variety of ways including, for example, along a drilling assembly utilized in a SAGD or subsea operation.

Alternatively, this method may be utilized to range from one producer to another, or to range from one injector to another. It is also noted that a correction may be applied to remove any effects of the producer or injector borehole from the received signal. The correction may be in the form of de-convolution or mapping with a pre-computed table that maps from results with the borehole to results without the borehole. Since the calculations in method 500 assume no borehole effects are present, removal of the borehole can significantly improve the accuracy of the results. It is also possible to remove effects of any layer boundaries by using a similar de-convolution or mapping methodology. In both cases, the de-convolution process consists of the application of a filter which is approximately inverse of the impulse response of the borehole or layer boundaries.

At block 608(a), the relative positioning system determines the distance and direction to the first wellbore using the gradiometric data. Here, for example, the algorithm described above (method 500) may be utilized. Finally, at block 610, the relative positioning system utilizes the distance and direction information to steer the drilling assembly. Here, the relative positioning system determines what actions, if any, are necessary to maintain or correct the desired drilling path. Such actions may be, for example, a change in direction, speed, weight on bit, etc. Thereafter, the algorithm returns to block 604 where it continues to excite the transmitters to continuously monitor and/or adjust the drill path as necessary.

In an alternate methodology, the same calculation described above can be applied in the frequency domain by taking the Fourier transform of the acoustic signal first (block 606(b)) and following the same steps for the frequency data whereby distance and direction to the first wellbore is determined using the gradiometric data (block 608(b0)). In those embodiments utilizing the frequency domain, the real, imaginary or complex value of the received acoustic signals can be used in the gradient and absolute signal calculation, as will be understood by those ordinarily skilled in the art having the benefit of this disclosure.

Accordingly, embodiments of the present disclosure described herein utilize acoustic gradient measurements to calculate the distance between a first and second well, wherein the calculation is independent of the acoustic properties of the materials between the wells. As a result, significant improvements over the existing approaches are provided, such as, for example: (i) no intervention in the target well is needed; and (ii) no wireline team is needed, thus providing significant cost savings.

Embodiments described herein further relate to any one or more of the following paragraphs:

1. A method for downhole acoustic ranging, the method comprising drilling a first wellbore; deploying an acoustic receiver in a second wellbore; emitting acoustic waves from the first wellbore; receiving the acoustic waves at the acoustic receiver; and utilizing gradiometric data of the received acoustic waves to thereby determine a distance between the first and second wellbores.

2. A method as defined in paragraph 1, further comprising utilizing the gradiometric data of the received acoustic waves to thereby determine a direction of the first wellbore in relation to the second wellbore.

3. A method as defined in any of paragraphs 1-2, wherein determining the distance between the first and second wellbores further comprises utilizing an absolute signal of the received acoustic waves to determine the distance between the first and second wellbores.

4. A method as defined in any of paragraphs 1-3, wherein utilizing the absolute signal further comprises utilizing a ratio of the absolute signal to a gradient signal to determine the distance between the first and second wellbores.

5. A method as defined in any of paragraphs 1-4, wherein a surface transmitter generates the acoustic waves along the first wellbore.

6. A method as defined in any of paragraphs 1-5, wherein a transmitter positioned along the second wellbore generates the acoustic waves along the first wellbore.

7. A method as defined in any of paragraphs 1-6, wherein emitting the acoustic waves from the first wellbore comprises generating the acoustic waves at frequencies ranges between 0.1 Hz and 100 kHz.

8. A method as defined in any of paragraphs 1-7, wherein the first wellbore is a producer well; and the second wellbore is an injector well, wherein the method is utilized in a Steam Assisted Gravity Drainage operation.

9. A method as defined in any of paragraphs 1-8, wherein the acoustic receiver is deployed along a drilling assembly extending down the second wellbore, the method further comprising: generating the acoustic waves using a surface transmitter; and propagating the acoustic waves down the first wellbore, whereby the acoustic waves are emitted toward the acoustic receiver.

10. A method as defined in any of paragraphs 1-9, wherein the acoustic receiver is deployed along a drilling assembly extending down the second wellbore, the method further comprising: generating the acoustic waves using a transmitter positioned along the drilling assembly; and propagating the acoustic waves toward the first wellbore, whereby the acoustic waves are emitted back from the first wellbore to the acoustic receiver.

11. A method as defined in any of paragraphs 1-10, wherein the acoustic waves are generated using noise caused by downhole operations.

12. A method as defined in any of paragraphs 1-11, wherein the acoustic receiver is deployed along a drilling assembly, the acoustic receiver comprising two or more receivers radially positioned around a body of the drilling assembly.

13. A method as defined in any of paragraphs 1-12, further comprising steering a drilling assembly deployed along the second wellbore using the determined distance between the first and second wellbores.

14. A method as defined in any of paragraphs 1-13, wherein utilizing the gradiometric data further comprises at least one of: removing borehole effects of the first wellbore from the received acoustic waves; or removing effects of layer boundaries from the received acoustic waves.

15. An acoustic ranging downhole assembly, comprising a bottom hole assembly comprising two or more receivers radially positioned around a body of the bottom hole assembly; and processing circuitry to implement a method comprising: receiving an acoustic wave emitted from a target wellbore; and utilizing gradiometric data of the received acoustic wave to thereby determine a distance between the target wellbore and a wellbore in which the bottom hole assembly is positioned.

16. An acoustic ranging downhole assembly as defined in paragraph 15, further comprising a transmitter to propagate the acoustic wave toward the target wellbore.

17. An acoustic ranging downhole assembly as defined in any of paragraphs 15-16, further comprising an isolator positioned along the bottom hole assembly between the transmitter and receivers.

18. An acoustic ranging downhole assembly as defined in any of paragraphs 15-17, wherein the bottom hole assembly is a drilling, wireline, or logging assembly.

Moreover, the methodologies described herein may be embodied within a system comprising processing circuitry to implement any of the methods, or a in a computer-program product comprising instructions which, when executed by at least one processor, causes the processor to perform any of the methods described herein.

Although various embodiments and methodologies have been shown and described, the disclosure is not limited to such embodiments and methodologies and will be understood to include all modifications and variations as would be apparent to one skilled in the art. For example, the relative positioning methods described herein may be utilized to locate other objects downhole, such as, for example vertical wells or branches of an injector or producer well. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for downhole acoustic ranging, the method comprising:
   drilling a first wellbore;
   deploying an acoustic receiver in a second wellbore;
   emitting acoustic waves from the first wellbore;
   receiving the acoustic waves at the acoustic receiver; and
   utilizing gradiometric data of the received acoustic waves to thereby determine a distance between the first and second wellbores.

2. A method as defined in claim 1, further comprising utilizing the gradiometric data of the received acoustic waves to thereby determine a direction of the first wellbore in relation to the second wellbore.

3. A method as defined in claim 1, wherein determining the distance between the first and second wellbores further comprises utilizing an absolute signal of the received acoustic waves to determine the distance between the first and second wellbores.

4. A method as defined in claim 3, wherein utilizing the absolute signal further comprises utilizing a ratio of the absolute signal to a gradient signal to determine the distance between the first and second wellbores.

5. A method as defined in claim 1, wherein a surface transmitter generates the acoustic waves along the first wellbore.

6. A method as defined in claim 1, wherein a transmitter positioned along the second wellbore generates the acoustic waves along the first wellbore.

7. A method as defined in claim 1, wherein emitting the acoustic waves from the first wellbore comprises generating the acoustic waves at frequencies ranges between 0.1 Hz and 100 kHz.

8. A method as defined in claim 1, wherein:
the first wellbore is a producer well; and
the second wellbore is an injector well, wherein the method is utilized in a Steam Assisted Gravity Drainage operation.

9. A method as defined in claim 8, wherein the acoustic receiver is deployed along a drilling assembly extending down the second wellbore, the method further comprising:
generating the acoustic waves using a surface transmitter; and
propagating the acoustic waves down the first wellbore, whereby the acoustic waves are emitted toward the acoustic receiver.

10. A method as defined in claim 8, wherein the acoustic receiver is deployed along a drilling assembly extending down the second wellbore, the method further comprising:
generating the acoustic waves using a transmitter positioned along the drilling assembly; and
propagating the acoustic waves toward the first wellbore, whereby the acoustic waves are emitted back from the first wellbore to the acoustic receiver.

11. A method as defined in claim 1, wherein the acoustic waves are generated using noise caused by downhole operations.

12. A method as defined in claim 1, wherein the acoustic receiver is deployed along a drilling assembly, the acoustic receiver comprising two or more receivers radially positioned around a body of the drilling assembly.

13. A method as defined in claim 1, further comprising steering a drilling assembly deployed along the second wellbore using the determined distance between the first and second wellbores.

14. A method as defined in claim 1, wherein utilizing the gradiometric data further comprises at least one of:
removing borehole effects of the first wellbore from the received acoustic waves; or
removing effects of layer boundaries from the received acoustic waves.

15. A downhole acoustic ranging system comprising processing circuitry to implement the method in claim 1.

16. An acoustic ranging downhole assembly, comprising:
a bottom hole assembly comprising two or more receivers radially positioned around a body of the bottom hole assembly; and
processing circuitry to implement a method comprising:
receiving an acoustic wave emitted from a target wellbore; and
utilizing gradiometric data of the received acoustic wave to thereby determine a distance between the target wellbore and a wellbore in which the bottom hole assembly is positioned.

17. An acoustic ranging downhole assembly as defined in claim 16, further comprising a transmitter to propagate the acoustic wave toward the target wellbore.

18. An acoustic ranging downhole assembly as defined in claim 17, further comprising an isolator positioned along the bottom hole assembly between the transmitter and receivers.

19. An acoustic ranging downhole assembly as defined in claim 16, wherein the bottom hole assembly is a drilling, wireline, or logging assembly.

* * * * *